United States Patent Office 2,926,120
Patented Feb. 23, 1960

2,926,120

PREPARATION OF AN ANTI-HOG CHOLERA PRODUCT

Mark E. Davenport, Jr., La Grange, Irby M. Bunding, Chicago, and Maurice A. Schooley, Western Springs, Ill., assignors to Armour and Company, Chicago, Ill., a corporation of Illinois No Drawing. Application July 29, 1957
Serial No. 674,593

4 Claims. (Cl. 167—80)

This application is a continuation-in-part of pending application, Serial No. 539,002, filed October 6, 1955, and now abandoned.

This invention relates to the preparation of an anti-hog cholera product, and more particularly to a process for obtaining a concentrate of hog cholera antibodies suitable for producing in swine a positive immunity to hog cholera virus.

The anti-hog cholera product utilized in conventional immunization of swine is anti-hog cholera serum prepared according to the process specified in the rules and regulations of the U.S. Department of Agriculture. This process involves injecting into hogs which have acquired an immunity to hog cholera at least 5 cc. of virulent hog cholera virus per pound of hog body weight. The immunity to hog cholera can be acquired by the animal as a natural immunity or produced by simultaneous injection of virulent or modified virus and anti-hog cholera serum into the animal. Hog cholera immune hogs injected with virulent or modified hog cholera virus develop hyperimmunization, i.e., they produce an excess of hog cholera antibodies. After a period of about ten to fourteen days of incubation the hyperimmunized blood can be withdrawn from the animal. Several bleedings can be obtained over a period of not more than forty days after hyperimmunization in which each bleeding is at least seven days from the preceding one. The usual sequence of bleedings includes three tail bleedings, and after finally sacrificing the hog, a throat bleeding. The hyperimmunized blood can then be pooled and, after defibrination, the serum can be separated from the stroma and pasteurized. The resulting anti-hog cholera serum can be preserved with phenol and tested for potency by injection into non-immune hogs together with virulent hog cholera virus.

Although it is recognized that a large part of the cost of a commercial anti-hog cholera serum is due to the large hypering doses of 5 cc. of virulent hog cholera virus which is initially injected for each pound of the immune hog body weight, nevertheless the industry has held to the belief for the past half-century that at least 5 cc. of the virus per pound of body weight is essential, and the regulations of the Bureau of Animal Industry have been based on the 5 cc. dose throughout the entire period until the present time.

An object of this invention is to provide a process for concentrating hog cholera antibodies to obtain an anti-hog cholera product which can confer immunity upon hogs by the injection of a significantly smaller quantity of such product than was heretofore possible. Another object is to provide a process for preparing an anti-hog cholera product adaptable to large scale manufacturing with considerably reduced costs in comparison with prevailing practices. A further object is to provide an anti-hog cholera product of a potency in the order of three or four times as great as that of anti-hog cholera serum. Other objects and advantages will become apparent as the specification proceeds.

In one aspect of this invention the anti-hog cholera product can be obtained by exposing a hog cholera immune hog to virulent hog cholera virus in an amount equivalent to not more than 4.5 cc. of hog cholera-infected blood per pound of hog body weight to hyperimmunize the hog. The blood of the hyperimmunized hog can be then withdrawn and subjected to chemical fractionation to obtain a concentrate of the hog cholera antibodies therein sufficient to produce immunity in non-immune hogs. This chemical fractionation can be obtained by extracting from the hyperimmunized blood the serum portion thereof, and treating such serum with a protein-precipitating reagent to selectively remove a fraction thereof consisting principally of serum globulins and hog cholera antibodies.

Although the hog cholera virus preparation utilized in this process to produce hyperimmunization of an immune hog may be modified or attenuated, we have obtained especially desirable results with virulent hog cholera virus. By "hog cholera-infected blood" is meant virulent hog cholera virus or hyperimmunizing virus obtained according to the process specified in the Rules and Regulations Relating to Viruses, Serums, etc., promulgated by the U.S. Department of Agriculture, March 1, 1949, and specified in section 118 thereof. By "modified" or "attenuated" hog cholera virus is meant a hog cholera virus which has been altered from a disease-producing virus to one incapable of causing disease. For example, a modified or attenuated hog cholera virus can be prepared by the method described in the co-pending patent application of J. A. Baker, Serial No. 486,676, filed February 7, 1955, wherein the hog cholera virus is rabbit-modified and hog-propagated and wherein a preferred practice of the attenuation process involves inoculating a non-immune pig from 5 to 10 weeks in age with an attenuated hog cholera virus, feeding the inoculated pig an adequate ration for normal growth, periodically measuring the temperature of the pig to determine the degree of temperature rise above normal, and harvesting viable hog cholera virus from the pig when its temperature has dropped from a maximum level above normal to an intermediate level above normal, providing the pig has approached a weight gain above normal of about 4 to 5 pounds per week.

The hyperimmunization of a hog cholera immune hog in this process should be produced by the inoculation thereof with the hog cholera virus in an amount equivalent to not more than 4.5 cc. of hog cholera-infected blood per pound of hog body weight, i.e., the equivalent of from 0.002 to 4.5 cc. of hog cholera-infected blood per pound of hog body weight. We have found that better results are obtained when the hog cholera immune hog is inoculated with the hog cholera virus in an amount equivalent to 0.02 to 3.0 cc. of hog cholera-infected blood per pound of hog body weight, and an especially desirable hog cholera product can be produced when hyperimmunization is obtained by the inoculation of a hog cholera immune hog with the hog cholera virus in an amount equivalent to from 0.1 to 1.0 cc. of hog cholera-infected blood per pound of hog body weight. The inoculation of the hog cholera immune hog with hog cholera virus can be obtained by parenteral administration thereof, e.g., intravenous or subcutaneous injection.

The period of incubation for obtaining hyperimmunization of the hog can be at least 11 days after the hyperimmunizing inoculation of hog cholera virus. Also, the number and sequence of the blood withdrawals from the hyperimmunized hog can be in accordance with prevailing practices. For example, the withdrawal of blood from the hyperimmunized hog can be obtained in from one to four bleedings at various time intervals from the tail, vein, throat, etc. This recovered blood can then be chemically fractionated to extract a concentrate of hog cholera antibodies and leaving behind the fibrinogen, albumin and other contaminant substances. This extraction of the hog cholera antibody concentrate may be obtained by defibrinating the blood, separating the stroma from the defibrinated blood to produce serum, and then fractionating the serum with a protein-precipitating agent to obtain a fraction thereof consisting principally of the serum globulins and hog cholera antibodies. The defibrination of the blood can be produced by stirring the blood with a wire to provide conversion of fibrinogen to fibrin, and then separating the coagulated fibrin from the blood. The separation of hemoglobin and cellular debris from the defibrinated blood can be achieved by adding thereto a Rouleauxing agent, such as jack bean extract, to obtain agglutination of the red blood cells, mixing also with the defibrinated blood a saturated solution of sodium chloride in an amount equivalent to 3 cc. per 100 cc. of blood, and centrifuging or filtering the blood to separate the resulting precipitate.

This serum can then be chemically fractionated with a protein-precipitating agent to obtain the hog cholera antibody concentrate. The chemical fractionation of the hyperimmunized serum can be obtained by a process such as that disclosed in Sammarata and Deutsch Arch. Biochem., 25, 354 (1950). Also, the chemical fractionation may be produced by the heat-shocking method disclosed by R. J. Seidel and M. J. West, U.S. Patent application Serial No. 406,598, filed January 27, 1954, now Patent No. 2,785,105, wherein one method of preparing a hog cholera antibody concentrate involves selectively coagulating a globulin fraction of serum containing gamma globulins, beta globulins and hog cholera antibodies by adjusting hyperimmunized serum to a pH of from 4.8 to 6.0, heating such serum at a temperature within the range of 40 to 65° C. to obtain a coagulum of such globulins and separating the coagulum from the solution of hog cholera antibodies. Other suitable methods for chemical fractionation of the hyperimmunized serum involve precipitation with ammonium sulfate, heavy metal ions, etc.

In the preferred method of obtaining the anti-hog cholera product hyperimmunized serum can be adjusted to a pH of from 6.7 to 7.1 and to an alcohol concentration of from 18 to 30% by volume, and the resulting precipitate may be separated from the supernatant liquid. The ionic strength of this alcohol solution may be from about 0.1 to 0.2 and the adjustment of such ionic strength can be obtained by regulating the amount of sodium chloride added to the defibrinated blood in separating out the cellular material. The temperature during this fractionation step should be from about 5° C. to a temperature above the freezing point of the alcohol solution. The alcohol, utilized in this fractionation procedure, can be methanol or ethanol, although ethanol is to be preferred, and can be added to the hyperimmunized serum in substantial anhydrous form, e.g. denatured 95% ethanol, or in a more dilute state to prevent denaturation of the protein therein, e.g. 53% aqueous alcohol. Especiallly desirable results are achieved when the alcohol fractionation is produced by adjusting the hyperimmunized serum to a pH of about 6.9, an ethanol concentration of about 25% by volume, and ionic strength of about 0.15, and a temperature of about 0 to −5° C. The precipitate thereby produced contains, principally, serum globulins and hog cholera antibodies. This precipitate can be separated from the supernatant liquid and suspended in water and the resulting solution adjusted to a pH of about 7.2 to precipitate other contaminant proteins, principally beta globulins. This beta globulin precipitate can be separated by centrifugation. The soluble fraction, containing principally gamma globulins and hog cholera antibodies, can be mixed with a preservative, e.g. phenol in an amount equivalent to 0.5%, and packaged for use in producing passive immunity in non-immune hogs.

The defibrinated serum, prior to chemical fractionation, can be pasteurized by heating to a temperature of from 58 to 59° C. in a suitable pasteurizing apparatus. When pasteurization has been completed the serum should be cooled as quickly as possible, and then mixed with a preservative, such as phenol in an amount equivalent to 0.5%, and stored pending the chemical fractionation operation. Also, the anti-hog cholera product obtained in this method may be similarly pasteurized and preserved.

The potency or titer of this anti-hog cholera product can be ascertained by inoculating non-immune hogs with such product in combination with virulent hog cholera virus, and observing the degree of protection afforded the hogs against hog cholera in comparison with control hogs which are inoculated with virulent hog cholera virus in the absence of hog cholera antibody concentrate.

This anti-hog cholera product can be utilized in producing immunity against hog cholera by inoculating non-immune hogs concomitantly with virulent or modified hog cholera virus and such product.

This invention can be further illustrated by the following specific examples:

EXAMPLE I

The following data will demonstrate the advantage of small doses of hyperimmunizing virus combined with fractionation of the resultant serum over the existing method of preparing serum.

Twelve hog cholera immune hogs were obtained from each of three sources. Six hogs were randomly selected from each group and hyperimmunized with a standard dose of virus, 5 cc. per pound of body weight. The remaining six hogs in each group were hyperimmunized with a low dose of virus, 0.5 cc. per pound of body weight.

The control groups were handled at all times in a standard fashion as prescribed by the U.S. Department of Agriculture. They were tail bled on the 11th, 18th and 25th days following hyperimmunization, and sacrificed for complete bleeding on the 32nd day. The serum obtained was processed under standard conditions.

The test groups were tail bled on the 11th, and 18th days following hyperimmunization and sacrificed for complete bleeding on the 25th day. The serum obtained was subjected to chemical fractionation.

The final yields of potent sera are shown in Table I. Groups A–1, C–1 and E–1 were control groups, and A–2, C–2 and E–2 were the respective test groups.

| Group No. | Weight | Total Amt. of Hyperimmunizing Virus (cc.) | Total Yield of Std. Potency Serum[1] (cc.) | Yield of Standard Potency Serum per lb. (cc.) | Yield of Standard Potency Serum/cc. of Hyperimmunizing Virus (cc.) |
|---|---|---|---|---|---|
| A–1 | 1,155 | 5,775 | 31,306 | 27.0 | 5.4 |
| C–1 | 1,145 | 5,725 | 32,795 | 28.6 | 5.7 |
| E–1 | 1,385 | 6,925 | 34,616 | 25.0 | 5.0 |
| Total | 3,685 | 18,425 | 98,717 | 26.8 | 5.4 |
| A–2 | 1,255 | 627.5 | 21,992 | 17.5 | 35.0 |
| C–2 | 1,170 | 585.0 | 21,252 | 18.2 | 36.3 |
| E–2 | 1,425 | 712.5 | 22,294 | 15.6 | 31.3 |
| Total | 3,850 | 1,925.0 | 65,538 | 17.5 | 34.0 |

[1] All six sera were shown by assay in hog cholera susceptible hogs to be of equal potency.

A 90% decrease in the dose of hyperimmunizing virus combined with fractionation of the serum resulted in a decrease of only 41.3% in serum yield. The yield of potent serum per cc. of hyperimmunizing virus was increased from 5.4 cc. to 34.0 cc.

EXAMPLE II

The following method was utilized in preparing an anti-hog cholera product:

Hog cholera immune hogs were randomly selected from three sources having an average weight, respectively, of 175, 280 and 260 pounds. There were five hogs from each source resulting in a hog cholera immune hog group numbering 15. These hogs were inoculated with 1.0 cc. of virulent hog cholera virus per pound of hog body weight, to produce hyperimmunization thereof. The hogs were bled from the tail on the twelfth day after inoculation with virus and bled from the throat on the nineteenth day after inoculation. The blood obtained in each bleeding was immediately defibrinated and 0.5% of phenol added thereto. The defibrinated blood from each bleeding was pooled and combined with jack bean extract and 3 cc. of a saturated sodium chloride solution per 100 cc. of blood. The resulting mixture was centrifuged to separate the stroma from the serum. This serum was pasteurized by heating at a temperature of 58 to 59° C. for a period of thirty minutes, then quickly cooled, mixed with phenol in an amount equivalent to 0.5%, and maintained in storage for subsequent chemical fractionation.

EXAMPLE III

The hyperimmune serum obtained according to the method of Example II was adjusted to pH 6.9, and a 53% aqueous solution of 3A alcohol added thereto, capillarywise, to a final alcohol concentration of 25% by volume. The alcohol was chilled to a temperature of about −20° C. prior to addition to the serum, and the resulting alcohol solution maintained at a temperature of about −5° C. The resulting precipitate was separated from the supernatant liquid by centrifugation at a temperature of −5° C. and held at refrigerator temperature pending further treatment.

EXAMPLE IV

A portion of the precipitate obtained according to the method of Example III was suspended in water, in an amount such as to produce a final protein concentration of about 3%. The resulting suspension was adjusted to pH 7.2 and stirred for a period of 24 hours at a temperature of about 0° C. The precipitate thereupon formed was separated from the supernatant liquid by centrifugation. To this supernatant liquid was added phenol in an amount equivalent to 0.5% and the resulting anti-hog cholera product stored pending inoculation into non-immune hogs.

EXAMPLE V

A portion of the precipitate obtained according to the method of Example III was suspended in water in such amount as to produce a final protein concentration of about 6%. This solution was adjusted to pH 7.2 and stirred for a period of 24 hours at a temperature of about 0° C. The precipitate thereupon formed was separated from the supernatant liquid by centrifugation. To this supernatant liquid was added phenol in an amount equivalent to 0.5%, and the resulting anti-hog cholera product stored pending inoculation into non-immune hogs.

EXAMPLE VI

A portion of each of the anti-hog cholera products obtained by the methods of Examples IV and V were pasteurized by heating at a temperature of 58 to 59° C. for a period of 30 minutes, then quickly cooled and phenol in the amount of 0.5% added thereto for preservative purposes. The pasteurized product of Example IV was designated as IV-A, while the pasteurized product of Example V was designated as V-A.

EXAMPLE VII

The potency of the anti-hog cholera products obtained by the processes of the foregoing examples was compared with that of commercial anti-hog cholera serum (VII). These anti-hog cholera products are designated herein by the number of the example according to which they were produced.

Non-immune pigs, numbering 123, were divided into 8 groups, each group consisting of 15 or 16 pigs. Each pig was inoculated with 2 cc. of virulent hog cholera virus, and each group of pigs, with the exception of one group which was maintained as a control, was injected with one of these anti-hog cholera products. Within each group of pigs the particular anti-hog cholera product was injected at two dosage levels. The mean temperature of the pigs on the day of treatment was 102.30° F. and the standard deviation of temperatures was 0.57° F.

The pigs were observed for a period of 14 days following inoculation, and the reactions of each pig within the groups recorded according to the following scoring system:

| Score | Definition |
|---|---|
| 0 | Not even an elevated temperature during the 14-day test period. |
| 1 | A temperature of 104.0° F. or higher on at least one day during the 14-day period; no other symptoms. |
| 2 | Visibly slow on at least one day during the test period but not sick; well at the end of 14 days. |
| 3 | Visibly sick on at least one day during the test period; well at the end of 14 days. |
| 4 | Slow or sick at the end of 14 days; well later. |
| 5 | Slow or sick at the end of 14 days; moribund or dead later. |
| 6 | Moribund at the end of 14 days (killed). |
| 7 | Dead on day 12, 13 or 14. |
| 8 | Dead on day 9, 10 or 11. |
| 9 | Dead on day 6, 7 or 8. |

The results are recorded in the following table:

| Anti-Hog Cholera Product | Dose (cc.) | Score 1 | 2 | 3 | 4 | 5 | 6 | 7 | 8 | Mean Score |
|---|---|---|---|---|---|---|---|---|---|---|
| II | 6.0 | 0 | 0 | 7 | 0 | 0 | 3 | 1 | 0 | 1.88 |
| II | 12.0 | 1 | 1 | 1 | 7 | 8 | 1 | 0 | 0 | 1.25 |
|  |  | 1 | 1 | 3 | 1 | 1 | 1 | 0 | 1 |  |
| IV | 5.0 | 1 | 1 | 0 | 0 | 0 | 7 | 1 | 0 | 2.38 |
| IV | 10.0 | 0 | 1 | 0 | 1 | 9 | 7 | 0 | 1 | 0.38 |
| IV-A | 5.0 | 1 | 0 | 0 | 0 | 1 | 0 | 0 | 1 | 3.38 |
| IV-A | 10.0 | 1 | 0 | 0 | 7 | 8 | 3 | 1 | 7 | .88 |
| V | 2.5 | 1 | 1 | 0 | 1 | 1 | 1 | 1 | 1 | 4.25 |
| V | 5.0 | 8 | 1 | 1 | 1 | 7 | 7 | 1 | 8 | 1.50 |
| V-A | 2.5 | 1 | 1 | 0 | 0 | 0 | 9 | 8 | 0 | 5.75 |
| V-A | 5.0 | 1 | 7 | 0 | 4 | 8 | 7 | 5 | 7 | 1.25 |
| VII | 5.0 | 1 | 0 | 3 | 1 | 1 | 3 | 0 | 1 | 5.25 |
| VII | 10.0 | 7 | 8 | 7 | 7 | 4 | 0 | 1 | 8 | 1.88 |
| Control (virus only) |  | [1]K K | K K | K K | K | K | K K | K |  |  |

[1] K indicates that the pig died.

A mean score in this table of not more than 3.0 indicates a negative response, while a score of greater than 3.0 indicates a positive response. Therefore, these results demonstrate that anti-hog cholera products obtained by the process of this invention have an activity at least as high, and a potency in the order of twice as great, as that of anti-hog cholera serum.

EXAMPLE VIII

The chemical fractionation procedure set forth in Example III was utilized in the treatment of hyperimmune serum obtained by inoculating hog cholera immune hogs with 0.002 cc. and 0.02 cc. of virulent cholera virus per pound of hog body weight. The resulting anti-hog cholera products were evaluated in non-immune hogs according to the method of Example VII. The results indicated that the hog cholera antibody potency of these products was approximately twice as great as that of commercial anti-hog cholera serum (VII).

While in the foregoing specification various embodiments of this invention have been set forth and specific details thereof elaborated for the purpose of illustration, it will be apparent to those skilled in the art that the invention is susceptible to other embodiments and that many of these details can be varied widely without departing from the basic concept and spirit of the invention.

We claim:

1. In a process for preparing an anti-hog cholera product, the step of producing hyperimmune blood, from which said anti-hog cholera product can be made, by exposing a hog cholera immune hog to hog cholera virus in a total amount equivalent from about 0.02 to 3.0 cc. of hog cholera-infected blood per pound of hog body weight to hyperimmunize said hog, and subsequently withdrawing blood from said hyperimmunized hog.

2. In a process for preparing an anti-hog cholera product, the step of producing hyperimmune blood, from which said anti-hog cholera product can be made, by exposing a hog cholera immune hog to hog cholera virus in a total amount equivalent from about 0.1 to 1.0 cc. of hog cholera-infected blood per pound of hog body weight to hyperimmunize said hog, and subsequently withdrawing blood from said hyperimmunized hog.

3. In a process for preparing an anti-hog cholera product, by innoculating a hog cholera immune hog with virulent hog cholera virus to hyperimmunize said hog, withdrawing blood from said hyperimmunized hog, extracting serum from said blood, concentrating the antibodies in said serum by chemically precipitating an antibody concentrate, and recovering said concentrate, the improved step comprising exposing said hog cholera immune hog to said hog cholera virus in a total amount equivalent from about 0.02 to 3.0 cc. of hog cholera-infected blood per pound of hog body weight to hyperimmunize said hog.

4. In a process for preparing an anti-hog cholera product, by inoculating a hog cholera immune hog with virulent hog cholera virus to hyperimmunize said hog, withdrawing blood from said hyperimmunized hog, extracting serum from said blood, adjusting said serum to a pH of from 6.7 to 7.1 and to an alcohol concentration of from about 18 to about 30% by volume and separating the precipitate thereupon formed from the supernatant liquid, the improved step comprising exposing said hog cholera immune hog to said hog cholera virus in a total amount equivalent from about 0.1 to 1.0 cc. of hog cholera-infected blood per pound of hog body weight to hyperimmunize said hog.

References Cited in the file of this patent

UNITED STATES PATENTS

| 823,110 | Dorset | June 12, 1906 |
| 2,720,484 | Meadows | Oct. 11, 1955 |
| 2,720,485 | Brueckner | Oct. 11, 1955 |

OTHER REFERENCES

King: Art. in Tech. Bull., Kansas State Agr. Coll., Exp. Stat., Bull. 171, pp. 168–184 (esp. p. 170), September 1910.

F.B., Farmer's Bulletin 834, U.S. Dept. of Agri., January 1921, p. 16.